Patented July 30, 1935

2,009,868

UNITED STATES PATENT OFFICE 2,009,868

METHOD OF PREPARING LEUCINE

Harold M. Barnett, Garfield Heights, Ohio, assignor to S. M. A. Corporation, Cleveland, Ohio, a corporation of Ohio No Drawing. Application May 1, 1933, Serial No. 668,809

14 Claims. (Cl. 260—119)

This invention relates to a method of obtaining leucine and, more particularly, to a new and improved method of obtaining this amino acid from mixtures with other acids in a pure or substantially pure condition.

Leucine, $C_6H_{13}NO_2$, or alpha amino isocaproic acid, is one of the amino acids obtainable by hydrolysis of proteins, in considerable amount depending upon the protein selected as a source. Since the amino acids, as a group, are generally considered to be among the most important, both biologically and chemically, in the realm of organic compounds, leucine is seen to belong to a class of substances of great interest. However, the known methods for the preparation of leucine, practiced only in the laboratory, are long and tedious and often give a product which is badly contaminated with other amino acids. Consequently, the price has been very high, at present $12.00 for 10 grams, or the equivalent of about $540.00 per pound, with the result that experimental investigations as to its properties, derivatives, physiological effects, etc., are the chief uses to which it has been put. A less expensive and more efficient method of preparation which would place leucine on the market in large quantities in sufficiently pure condition is, naturally, a prerequisite to the development of practical uses for the substance.

It is, accordingly, an object of the present invention to provide a method for the preparation of leucine efficiently in pure or approximately pure condition. Another object of the invention is to provide an improved method for the separation of leucine from mixtures containing other amino acids resulting from the hydrolysis of proteins. Other objects of the invention will in part be obvious and in part appear hereinafter.

The process is applicable either to naturally occurring or synthetic mixtures of amino acids, such as the protein hydrolysates, or other materials containing leucine. Amino acids are obtained from proteins upon the breaking down of the latter by hydrolysis with acids, alkalies or enzymes. Acids are more commonly employed, the usual method being to hydrolyze with an acid, such as hydrochloric acid, neutralize and then collect a mixture of amino acids in one form or another. This preliminary hydrolysis is, of course, omitted when the leucine is to be separated from existing amino acid mixtures.

In the new process, where protein is selected as the starting material, protein materials, such as wheat gluten, casein, zein and the like are hydrolyzed by boiling the same with hydrochloric acid, specific gravity about 1.1, for about sixteen hours, the ratio of acid to protein being three to one. It should be understood, however, that any and all of the conditions during this hydrolysis step such as, for example, time, temperature, strength of acid, use of catalysts, ratio of acid to protein, etc., may be varied to suit any conditions which may arise. For instance, hydrolysis under pressure may be used to reduce the time of treatment, and the product of hydrolysis by acids other than hydrochloric, alkalies or enzymes may be used in the process. In fact, any feasible method may be used to obtain a protein hydrolysate containing a mixture of amino acids including leucine. The protein hydrolysate, however obtained, is then subjected to the procedure set forth hereinafter, or its equivalent.

Where hydrochloric acid is used as the hydrolyzing medium, the protein hydrolysate is concentrated under reduced pressure to remove as much of the free hydrochloric acid as possible without raising the temperature above 120° C. In this way, about 40% of the original hydrochloric acid is recovered and may be used in making up the mix for a subsequent hydrolysis. The thick residue is taken up with about twice its volume of hot water and partially neutralized by the addition of alkali, preferably a strong solution of sodium hydroxide, although hydrates or carbonates of any alkali metal or alkaline earth metal may be employed, such as sodium carbonate. This neutralization should be carried to a point within the hydrogen ion concentration range represented by a pH value of 1.8 to 2.6, the particular value chosen depending upon other factors such as the amount of tyrosine present in the particular protein being used. The neutralization may be followed and closely controlled by sue of the quinhydrone electrode or by any other method of determining hydrogen ion concentration which may be adapted to the purpose. In making these determinations, it may be advisable in some cases to partially decolorize an aliquot portion of the hydrolysate with activated carbon to avoid interference by the coloring matter in the solution.

The mixture is then partially decolorized by boiling for a few minutes with activated carbon and filtering while still hot. This decolorizing treatment presents two distinct advantages in the process, in that the carbon is more effective as a decolorizing agent when the solution is partially neutralized and avoids the necessity of performing a difficult filtration of a strongly acid mixture. The process can, of course, be carried on without the decolorizing step but the product will then be somewhat discolored or require subsequent treatment.

If the protein material used yields a relatively large amount of tyrosine, another of the amino acids resulting from the hydrolysis of proteins, as is true of casein, then some of the tyrosine will crystallize out at this point in the process and may be recovered by filtration. If, however, the percentage of tyrosine is lower, as in the case of wheat gluten, then all of it remains in solution. The hydrolysate is then concentrated under reduced pressure until it is saturated, or nearly so, with sodium chloride formed by the neutralization of hydrochloric acid with the alkali. The solution is now saturated with an inorganic salt, namely, sodium chloride and I have found that leucine may be salted out of such solutions containing it and other amino acids, such as solutions arising from the hydrolysis of proteins, the leucine being particularly susceptible to such salting out effect and the other amino acids occurring therewith in protein hydrolysates or the like tending to remain in solution. In this way, an effective separation of the leucine from related amino acids may be achieved, such a separation having heretofore been a very difficult one, as might be expected from the similar properties of the individual amino acids in protein hydrolysate mixtures. While portions of the other amino acids will also come down with the leucine substance, these are small in quantity, a precipitate containing as high as 85% of forms of leucine having been obtained.

From the aforementioned protein hydrolysate approximately saturated with sodium chloride, leucine commences crystallizing out as dileucine hydrochloride before the above-mentioned concentration is complete, the salt formed in the neutralization acting as the salting-out agent. Leucine has not previously been salted out from protein hydrolysates in the form of the dileucine hydrochloride, from which leucine itself can readily be regenerated.

While a useful separation of leucine can be achieved from solutions having varying hydrogen ion concentrations, I have found that the salting-out effect is greatest at a hydrogen ion concentration of the solution of about pH 2.4, that it rapidly diminishes as the solution is made more acid, and that it slowly decreases as the pH value shifts from 2.4 to 8.0, or from a strongly acid solution to a slightly basic one. In this last-mentioned range, there may be salted out dileucine hydrochloride, mixtures of dileucine hydrochloride and free leucine, or leucine alone, depending upon the hydrogen ion concentration selected. Thus, it is possible to precipitate either form of leucine or mixtures of the two forms in various proportions according to the hydrogen ion concentration chosen.

However, since the primary object of the invention is to secure as large an amount of leucine as can be recovered, as free as possible from contamination with other amino acids, a pH value as near as possible to 2.4 should be maintained. The new method is, of course, applicable over a considerable range of hydrogen ion concentration but, in general, satisfactory results may be obtained within a range of pH 1.8 to 2.6 and best results at pH 2.4. Salting out within this range gives the best results from the standpoint of yield, purity, utilization of the mother liquor, etc. After standing a few hours the dileucine hydrochloride is removed by filtration or other suitable means and washed with 20% sodium chloride solution, the resulting product naturally having a high salt content and also containing various amounts of other amino acids which are carried down in the bulky precipitate and not entirely removed by washing. This crude dileucine hydrochloride is dissolved in the least volume of hot water possible and neutralized with alkali to about pH 6.0, thus changing the dileucine hydrochloride to leucine, which is less soluble and of which a large portion precipitates. This crop of crystals is removed and the filtrate concentrated, cooled and a second crop of crystals recovered.

For a still purer product, the leucine may be dissolved in hot 70% alcohol, decolorized with carbon and allowed to recrystallize. By this purification step, yields of 2.5% of purified leucine may be obtained from wheat gluten (75–80% protein), yields of 6% from commercial casein, and even more from other proteins.

While the method has been described above with particular reference to the treatment of a hydrolysate obtained by treating protein material with hydrochloric acid and then adding sodium hydroxide to neutralize to the desired pH number and salt out the leucine substance by means of the formed NaCl, leucine and dileucine hydrochloride may be salted out from protein hydrolysates with other inorganic salts such as, for example, ammonium sulphate and sodium sulphate, but sodium chloride is preferred because it is formed in the hydrolysate as a result of neutralization of hydrochloric acid used in the hydrolysis. Of course, advantage should be taken of the presence of hydrochloric acid and its ability to form sodium chloride by neutralization with sodium hydroxide, but, where the hydrolysis is not performed with hydrochloric acid, it may sometimes be advantageous to use other salts for the salting-out step. Also, either one salt alone may be used for this purpose or a mixture of salts may be used, such a mixture being, for example, the sodium chloride formed in the neutralization of a hydrochloric acid hydrolysate and one of the sulphates mentioned, which may be added in place of additional sodium chloride for salting out.

The herein described method of obtaining the amino acid, leucine, results in the recovery of this substance present in a large proportion of the protein, up to within two or three per cent of the amount present, and the yields are somewhat proportional to the quantities occurring in the raw material. The leucine thus obtained is quite pure but some latitude in respect to purity may be exercised if a high degree purity is not desired, as may sometimes be the case. The invention thus includes the feature of precipitating leucine from protein hydrolysate mixtures containing it, as the dileucine hydrochloride, and also the procedure of maintaining the hydrogen ion concentration of the hydrolysate, or other amino acid mixture, within a preferred range for best results when salting out, although this preferred range may be exceeded while still obtaining a separation of the leucine from the other amino acids present. It is particularly desirable to maintain the hydrogen ion concentration of the solution within the range of pH 1.8 to 2.6 where it is expected subsequently to treat the same solution further for the isolation of glutamic acid, for which purpose the solution should be neutralized to pH 3.2. Consequently, the solution need merely be neutralized by the addition of more sodium hydroxide after the separation of leucine is finished. The glutamic acid is not greatly susceptible to the salting-out effect and does not come down in large amount with leucine, its separation being effected by a different method.

What I claim is:

1. The method of treating a protein selected from a group consisting of gluten, casein and zein which comprises hydrolyzing the protein, bringing the hydrolysate to a pH value of from 1.8 to 8.0, in the presence of a sufficient amount of a soluble salt to cause a form of leucine to precipitate.

2. The method of treating a protein selected from a group consisting of gluten, casein and zein which comprises hydrolyzing the protein with hydrochloric acid, neutralizing the hydrolysate with an alkali to a pH value of 1.8 to 8.0, and concentrating the mixture to cause the precipitation of a form of leucine.

3. The method of obtaining leucine from its admixture with one or more of the amino acids occurring in the hydrolysate of a protein selected from a group consisting of gluten, casein and zein, which comprises adding a soluble inorganic salt to the mixture until the solution is approximately saturated with said salt and precipitating out a form of leucine.

4. The method of obtaining leucine from its admixture with one or more of the amino acids occurring in the hydrolysate of a protein selected from a group consisting of gluten, casein and zein, which comprises hydrolyzing the selected protein with hydrochloric acid to form said admixture of acids, and approximately saturating the mixture with sodium chloride to salt out dileucine hydrochloride.

5. The method of obtaining leucine from its admixture with one or more of the amino acids occurring in the hydrolysate of a protein selected from a group consisting of gluten, casein and zein, which comprises hydrolyzing the selected protein with hydrochloric acid to form said admixture of acids, approximately saturating the mixture with a sufficient amount of soluble salt to salt out the dileucine hydrochloride, collecting the precipitate and redissolving the same, bringing the second solution to approximate neutrality and precipitating out leucine.

6. The method of obtaining leucine from its admixture with one or more of amino acids occurring in the hydrolysate of a protein selected from a group consisting of gluten, casein and zein, which comprises bringing the mixture to a pH value of about 1.8 to 2.6, and enriching the mixture in soluble salts to precipitate out a form of leucine.

7. The method of obtaining leucine from its admixture with one or more of the amino acids occurring in the hydrolysate of a protein selected from a group consisting of gluten, casein and zein, which comprises bringing the mixture to a pH value of about 1.8 to 2.6, and adding a sufficient quantity of at least one soluble salt thereto to precipitate out a form of leucine.

8. The method of obtaining leucine from its admixture with one or more of the amino acids occurring in the hydrolysate of a protein selected from a group consisting of gluten, casein and zein, which comprises neutralizing the mixture to a pH value of about 1.8 to 2.6 by the addition of a base, concentrating the mixture and precipitating out a form of leucine.

9. The method of obtaining leucine from its admixture with one or more of the amino acids occurring in the hydrolysate of a protein selected from a group consisting of gluten, casein and zein, which comprises hydrolyzing the selected protein with hydrochloric acid to form said admixture of acids, neutralizing the mixture to a pH value of 2.4, concentrating the same, and precipitating out dileucine hydrochloride.

10. The method of obtaining leucine from its admixture with one or more of the amino acids occurring in the hydrolysate of a protein selected from a group consisting of gluten, casein and zein, which comprises hydrolyzing the selected protein with hydrochloric acid to form said admixture of acids, neutralizing the mixture to a pH value of about 2.4, concentrating the same, precipitating out dileucine hydrochloride, dissolving the latter and neutralizing the solution to about pH 6.0 to precipitate leucine.

11. The method of obtaining leucine from its admixture with one or more of the amino acids occurring in the hydrolysate of a protein selected from a group consisting of gluten, casein and zein, which comprises hydrolyzing the selected protein with hydrochloric acid to form said admixture of acids, neutralizing the mixture with sodium hydroxide to a pH value of 2.4, concentrating the mixture and collecting the salted out dileucine hydrochloride.

12. The method of obtaining leucine from its admixture with one or more of the amino acids occurring in the hydrolysate of a protein selected from a group consisting of gluten, casein and zein, which comprises neutralizing the mixture to a pH value of about 1.8 to 2.6, decolorizing with activated carbon, filtering, concentrating the mixture and collecting the precipitated form of leucine.

13. The method of obtaining leucine from its admixture with one or more of the amino acids occurring in the hydrolysate of a protein selected from a group consisting of gluten, casein and zein, which comprises hydrolyzing the selected protein with hydrochloric acid to form said admixture of acids, neutralizing the mixture with a base until a pH value of about 1.8 to 2.6 is reached, concentrating the neutralized mixture until approximate saturation with salt is attained, and collecting the salted out dileucine hydrochloride.

14. The method of obtaining leucine from its admixture with one or more of the amino acids occurring in the hydrolysate of a protein selected from a group consisting of gluten, casein and zein, which comprises hydrolyzing the selected protein with hydrochloric acid to form said admixture of acids, bringing the mixture to pH values within the range from 2.4 to 8.0 and concentrating the same in the presence of a sufficient amount of a soluble salt to precipitate out dileucine hydrochloride, mixtures of dileucine hydrochloride and leucine, or leucine respectively, according as the acidity of the mixture is decreased.

HAROLD M. BARNETT.